US012761605B2

(12) United States Patent
Igi et al.

(10) Patent No.: US 12,761,605 B2
(45) Date of Patent: Oct. 13, 2026

(54) ARM WEARABLE DEVICE AND TIMEPIECE

(71) Applicant: CASIO COMPUTER CO., LTD., Tokyo (JP)

(72) Inventors: Hiroki Igi, Yokohama (JP); Masataka Iida, Hachioji (JP); Takayuki Umemoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 412 days.

(21) Appl. No.: 18/340,360

(22) Filed: Jun. 23, 2023

(65) Prior Publication Data

US 2023/0418232 A1 Dec. 28, 2023

(30) Foreign Application Priority Data

Jun. 24, 2022 (JP) ................................ 2022-102253
Aug. 31, 2022 (JP) ................................ 2022-138153

(51) Int. Cl.
*G04B 37/05* (2006.01)
*G04B 45/00* (2006.01)

(52) U.S. Cl.
CPC ......... *G04B 37/05* (2013.01); *G04B 45/0076* (2013.01)

(58) Field of Classification Search
CPC .... G04B 37/05; G04B 45/0076; G04B 37/14; G04B 37/00; G04G 17/08
USPC ........................................................ 368/300
See application file for complete search history.

(56) References Cited

U.S. PATENT DOCUMENTS

2012/0257481 A1* 10/2012 Hiranuma .............. G04G 17/02 368/239
2021/0141342 A1* 5/2021 Amano .................. G04B 19/10

FOREIGN PATENT DOCUMENTS

GB 1286120 A 8/1972
JP S63-035982 U 3/1988
JP 2020159767 A * 10/2020
WO WO-2015144382 A1 * 10/2015 ............ G04B 19/14

OTHER PUBLICATIONS

Tajima et al. (JP 2020159767 A) machine translation of publication provided by Espacenet (Year: 2020).*
Extended European Search Report dated Nov. 28, 2023 received in European Patent Application No. 23180142.4.
Notice of Reasons for Refusal dated Apr. 16, 2024 received in Japanese Patent Application No. JP 2022-138153.

* cited by examiner

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

An arm wearable device including a case, a module which has a brittle member and is provided in the case, and a plurality of holding portions which holds the module in the case such that flexural deformation of the module is restricted to deformation where a virtual straight line extending in a longitudinal direction of the brittle member serves as a center line.

19 Claims, 10 Drawing Sheets

ARM WEARABLE DEVICE AND TIMEPIECE

CROSS-REFERENCE TO RELATED APPLICATIONS

This application is based upon and claims the benefit of priority from the prior Japanese Patent Applications No. 2022-102253, filed Jun. 24, 2022, and No. 2022-138153, filed Aug. 31, 2022, the entire contents of which are incorporated herein by reference.

BACKGROUND OF THE INVENTION

1. Field of the Invention

The present invention relates to an arm wearable device such as a wristwatch, and a timepiece.

2. Description of the Related Art

For example, Japanese Utility-Model Application Laid-Open (Kokai) Publication No. 63-035982 discloses a wristwatch having a structure where a plurality of spring members has been provided on the inner circumferential surface of a wristwatch case, and a timepiece module has been resiliently held between these spring members in the wristwatch case.

SUMMARY OF THE INVENTION

In accordance with one aspect of the present invention, there is provided an arm wearable device, comprising: a case; a module which has a brittle member and is provided in the case; and a plurality of holding portions which holds the module in the case such that flexural deformation of the module is restricted to deformation where a virtual straight line extending in a longitudinal direction of the brittle member serves as a center line.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment in which the present invention has been applied in a wristwatch will hereinafter be described with reference to FIG. 1 to FIG. 10.

Figure 1:
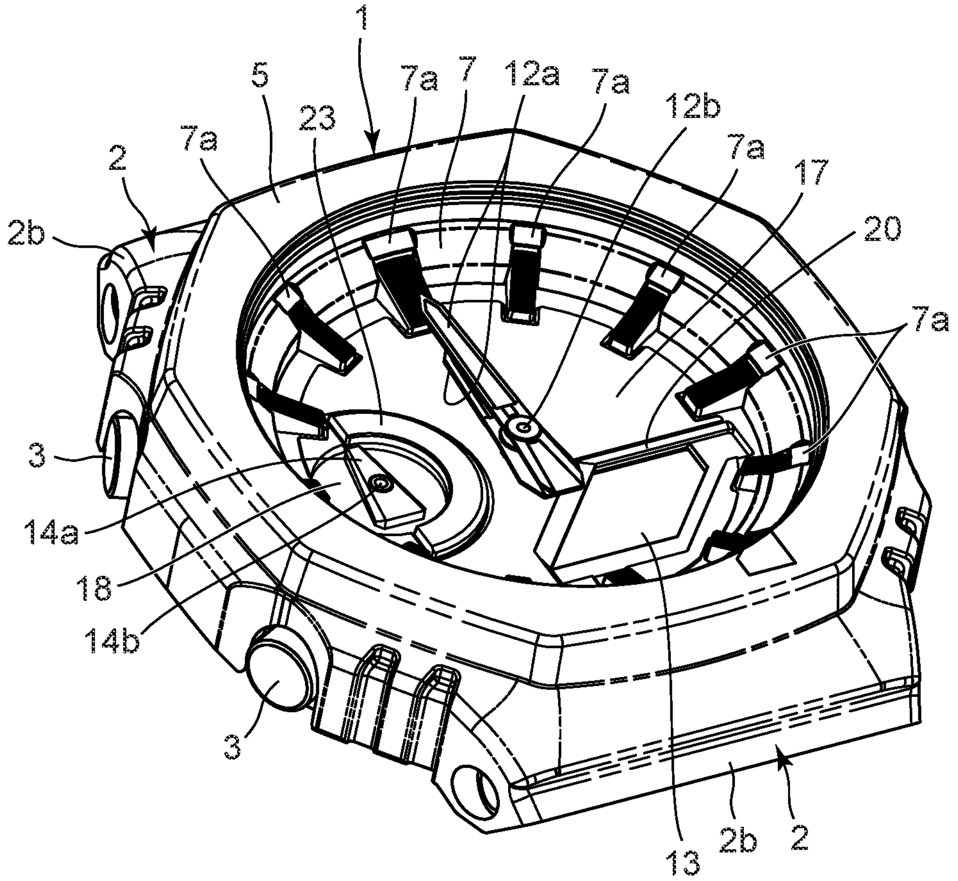
FIG. 1 is an enlarged perspective view of an embodiment in which the present invention has been applied in a wristwatch.
Figure 2:
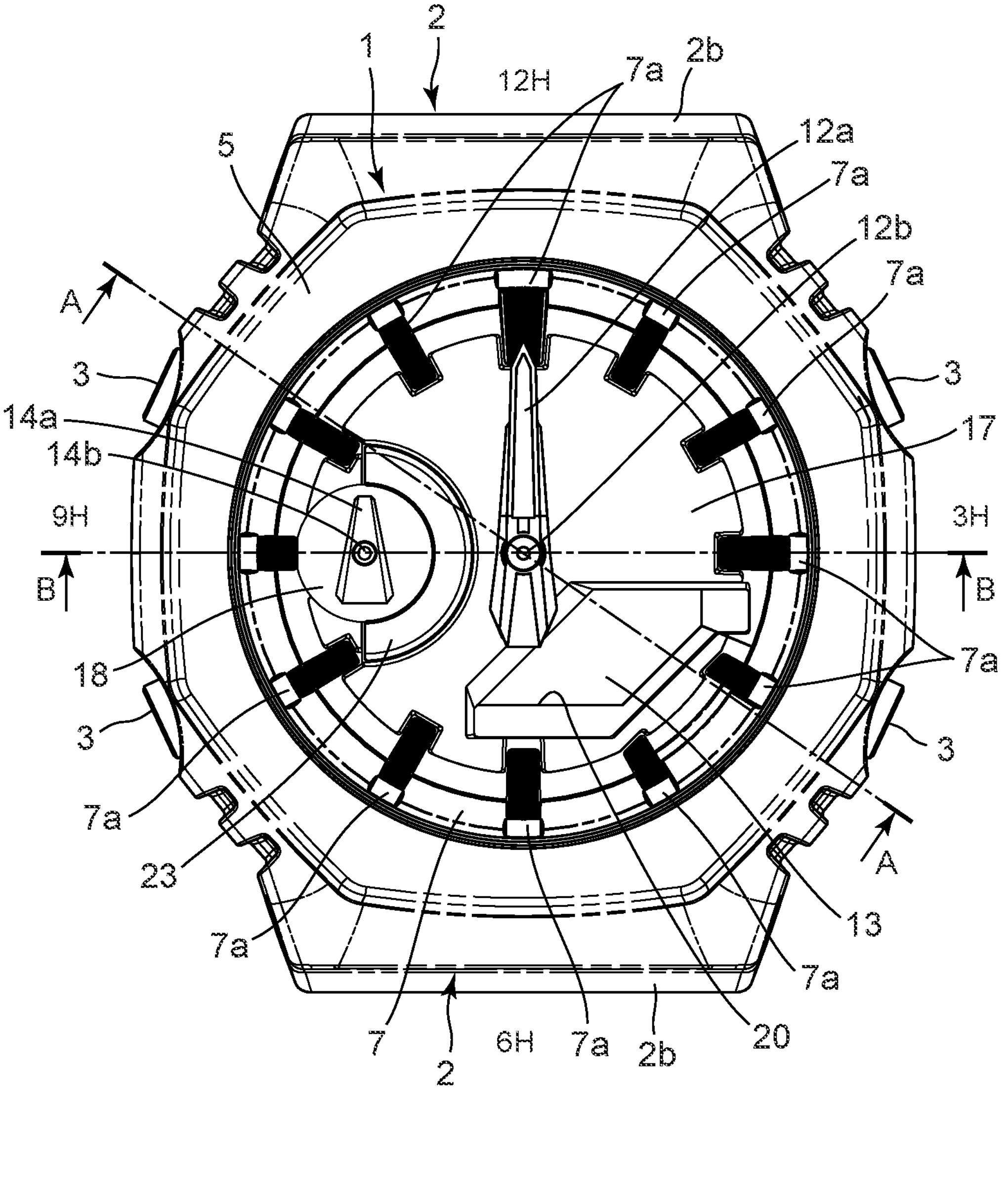
FIG. 2 is an enlarged front view of the wristwatch shown in FIG. 1.

This wristwatch includes a wristwatch case 1, as shown in FIG. 1 and FIG. 2. On the six o'clock side and twelve o'clock side of the wristwatch case 1, band attachment sections 2 are provided to which watch bands (not shown in the drawings) are attached. In addition, on the two o'clock side, four o'clock side, eight o'clock side, and ten o'clock side of the wristwatch case 1, push button switches 3 are provided.

In the case of the above-described conventional technique, when the wristwatch case is subjected to an impact from its lateral direction, this impact is buffered by the resilience of the plurality of spring members. Accordingly, the timepiece module provided in the wristwatch case is protected so as not to be damaged by the impact.

However, the wristwatch of the above-described conventional technique has a problem in that, when the wristwatch case is subjected to an impact from its front or back direction, that is, its thickness direction, the timepiece module in the wristwatch case is flexurally deformed in the thickness direction by this impact, which may damage brittle components such as a liquid crystal display panel mounted in the timepiece module.

The present embodiment is to improve this situation, and has a below-described structure capable of preventing brittle components from being damaged.

Figure 3:
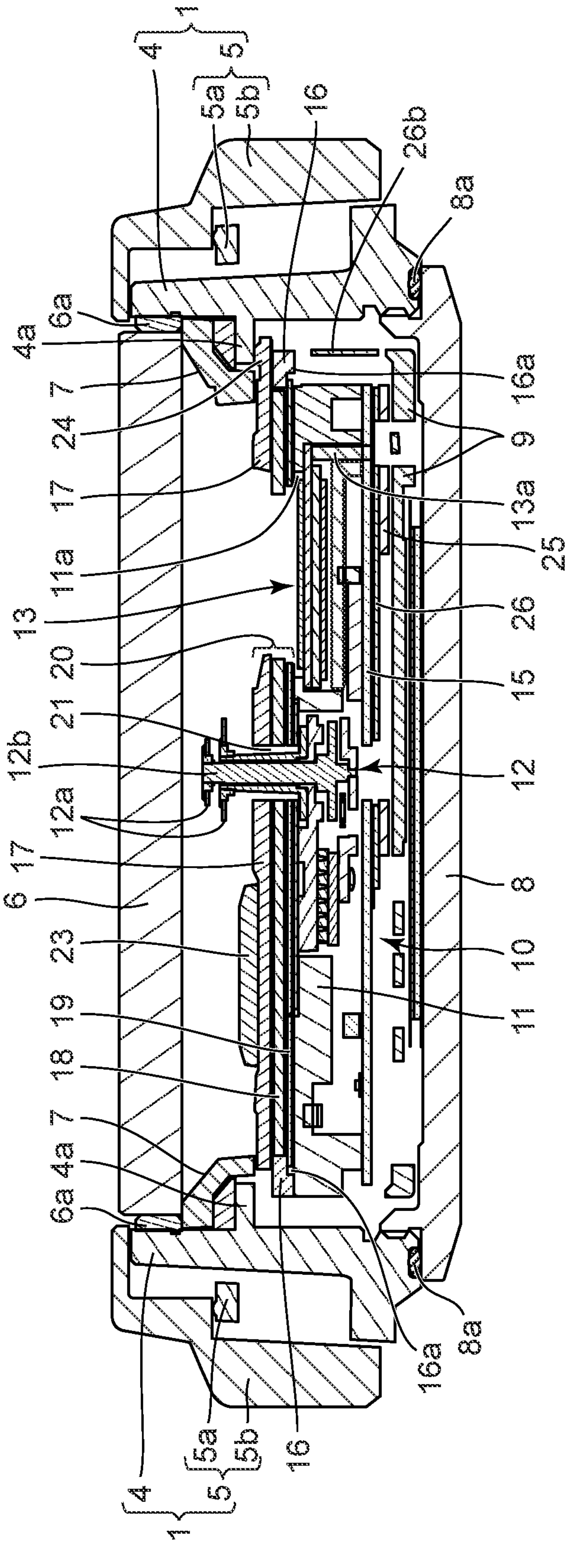
FIG. 3 is an enlarged sectional view of the wristwatch taken along the A-A arrow view in FIG. 2.
Figure 4:
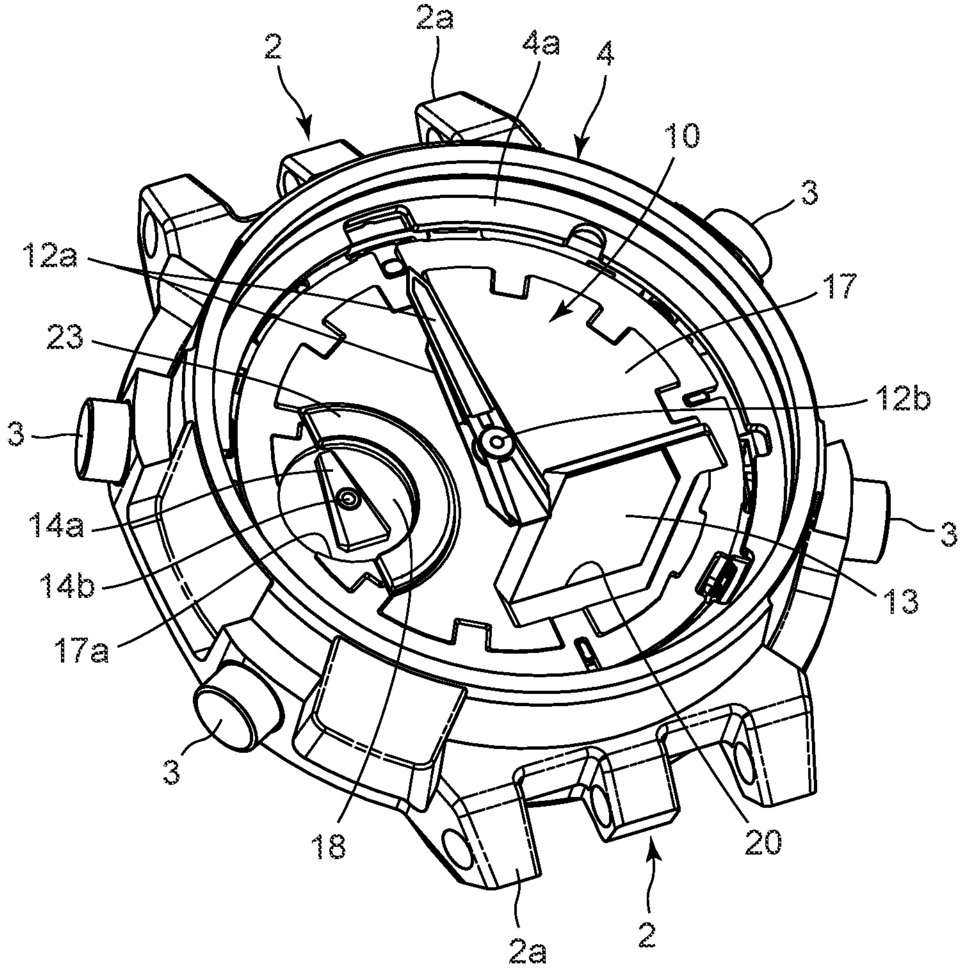
FIG. 4 is an enlarged perspective view of the wristwatch of FIG. 1, in which a mounted state of a timepiece module in the main body case of a wristwatch case is shown.
Figure 6:
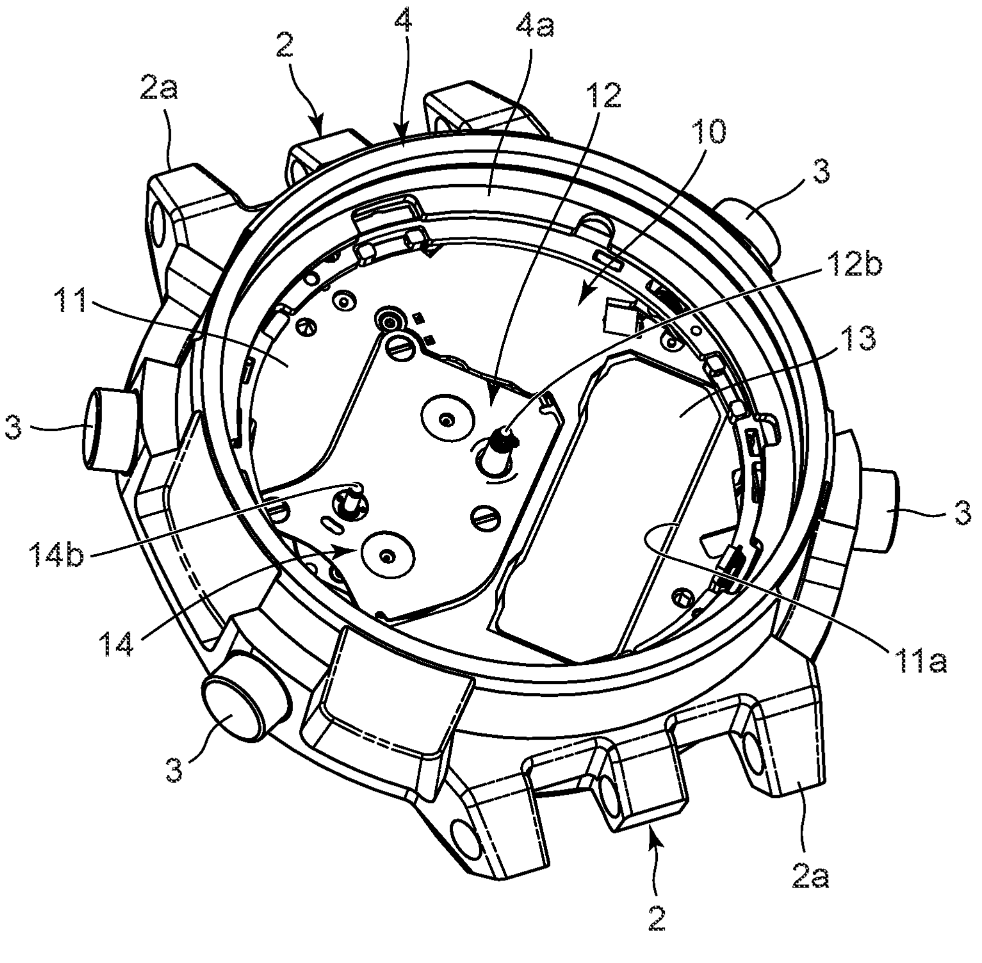
FIG. 6 is an enlarged perspective view showing the upper surface side of the housing of the timepiece module mounted in the main body case of the wristwatch shown in FIG. 4.

The wristwatch case 1 of the present embodiment includes a main body case 4 and an exterior case 5, as shown in FIG. 3. The main body case 4 is made of a metal such as stainless steel or a highly rigid synthetic resin and has a cylindrical shape. On the six o'clock side and twelve o'clock side of the main body case 4, main body sections 2*a* of the band attachment sections 2 are formed, as shown in FIG. 4 and FIG. 6. Also, on the inner circumferential surface of the main body case 4, a flange section 4*a* is formed projecting in a ring shape, as shown in FIG. 3 and FIG. 4.

The exterior case 5 includes a first exterior member 5*a* (buffering body) that is arranged on the outer circumferential part of the main body case 4, and a second exterior member 5*b* that is arranged covering the first exterior member 5*a* and the upper part of the main body case 4, as shown in FIG. 1 to FIG. 3. The first exterior member 5*a* (buffering body) is made of synthetic resin, and the second exterior member 5*b* is made of a metal such as stainless steel or a highly rigid synthetic resin, as with the main body case 4. On the twelve and six o'clock sides of these first and second exterior members 5*a* and 5*b*, cover sections 2*b* of the band attachment sections 2 are provided which cover the main body sections 2*a* of the band attachment sections 2 formed on the main body case 4.

To the upper opening of the main body case 4, a watch glass 6 is attached via a packing 6*a*, as shown in FIG. 3. Under this watch glass 6, a parting member 7 having hour markers 7*a* are provided and arranged on the flange section 4*a* in the main body case 4, as shown in FIG. 1 to FIG. 3.

Also, to the lower part of the main body case 4, a back cover 8 is attached via a waterproof ring 8*a*. Moreover, inside the main body case 4, a timepiece module 10 is provided via a middle frame 9 (refer to FIG. 8).

The timepiece module 10 has a housing 11 that is arranged in the middle frame 9, as shown in FIG. 3 to FIG. 6. This housing 11 is provided with a first timepiece movement 12 which moves pointers 12*a* such as an hour pointer and a minute pointer for indicating the time, a liquid crystal display panel 13 which is a brittle display member for electrooptically displaying information such as a time of day, a date, and a day of the week, a second timepiece movement 14 which rotates a sub-pointer 14*a* for indicating sub-functional information such as a remaining battery level, and a battery (not shown in the drawings). On the lower part of this housing 11, a circuit board 15 is provided.

Figure 7:
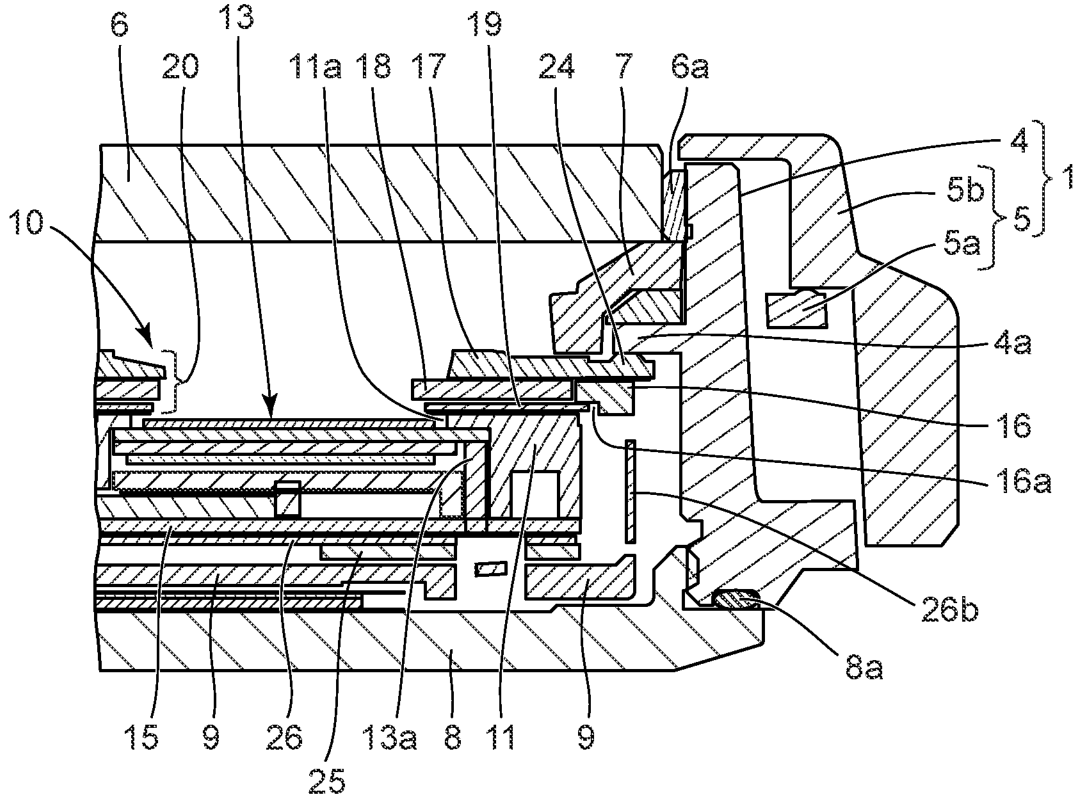
FIG. 7 is an enlarged sectional view of a main portion of the wristwatch shown in FIG. 3.
Figure 8:
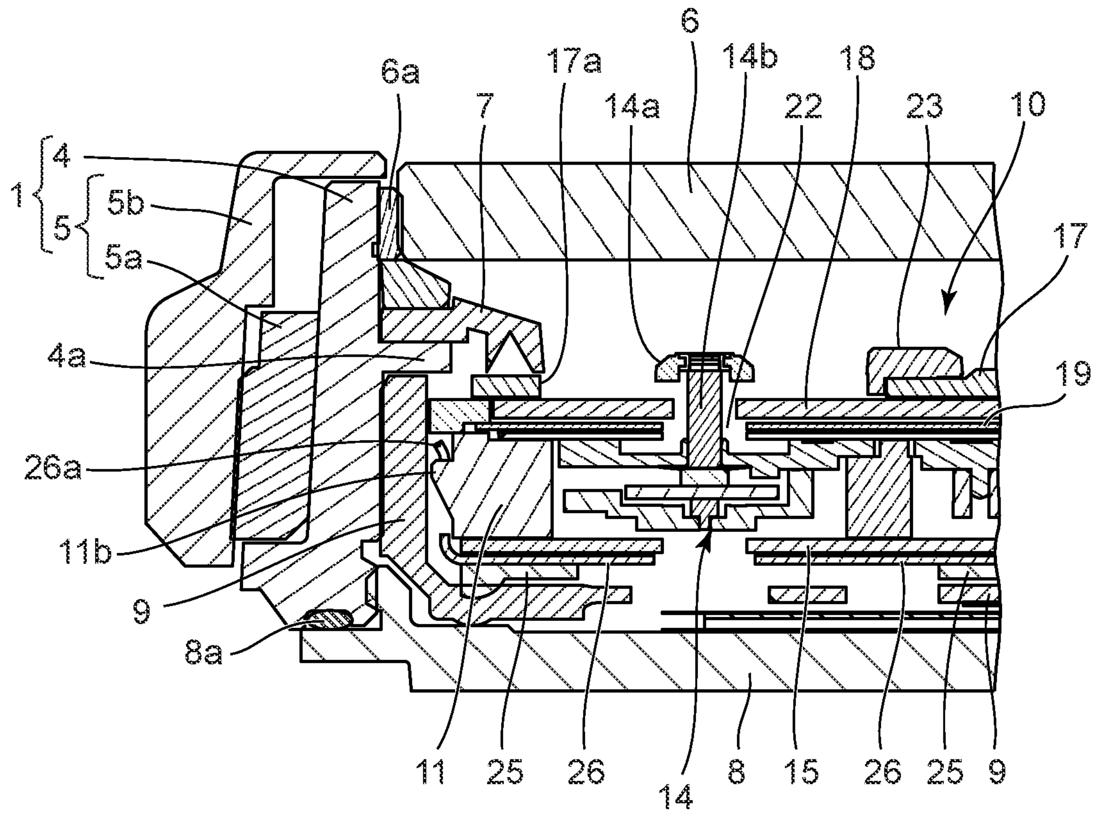
FIG. 8 is an enlarged sectional view of a main portion of the wristwatch taken along the B-B arrow view in FIG. 2.

To this circuit board 15, the first and second timepiece movements 12 and 14, the liquid crystal display panel 13, and the battery (not shown in the drawings) are electrically connected, as shown in FIG. 3, FIG. 7, and FIG. 8. The liquid crystal display panel 13, which is a brittle member, has a substantially rectangular shape elongated toward the six o'clock side from the three o'clock side, as shown in FIG. 6. This liquid crystal display panel 13 is arranged corresponding to a rectangular display opening section 11*a* formed in the housing 11 and extending from the three o'clock side of the housing 11 toward the six o'clock side thereof.

Also, this liquid crystal display panel 13 includes a display element in which liquid crystals have been enclosed between a pair of upper and lower transparent glass substrates and polarizing plates have been arranged on the top surface and undersurface of the pair of glass substrates, and a back light device which is arranged under the display element and illuminates the undersurface side of the display element, as shown in FIG. 3 and FIG. 7. Moreover, this liquid crystal display panel 13 is structured to be electrically connected to the circuit board 15 by an interconnector 13*a* and, in this state, arranged in the housing 11 while being supported on the circuit board 15 by the interconnector 13*a*.

Under the circuit board 15, a base plate 26 is provided, as shown in FIG. 3 and FIG. 7. This base plate 26 is formed of a thin plate made of a metal such as stainless steel, and attaches the circuit board 15 to the undersurface of the housing 11. More specifically, this base plate 26 is structured such that a plurality of hook sections 26*a* is provided upright on outer circumferential portions of this base plate 26 along the outer circumferential surface of the housing 11 (refer to FIG. 8), and disengageably engage with a plurality of projection sections 11*b* formed on the outer circumferential surface of the housing 11, whereby the circuit board 15 is pressed against and attached to the undersurface of the housing 11.

On the plurality of hook sections 26*a* of the base plate 26, contact springs 26*b* are provided, as shown in FIG. 3, FIG. 5, FIG. 7, and FIG. 8. These plural contact springs 26*b* are plate springs extending along the outer circumference of the housing 11, and provided corresponding to the plurality of push button switches 3. More specifically, these contact springs 26*b*, which force the push button switches 3 in directions in which the push button switches 3 are pressed toward the outside of the wristwatch case 1, are structured to detachably come in contact with contact points (not shown in the drawings) of the circuit board 15 when the push button switches 3 are pressed against the spring force.

Figure 5:
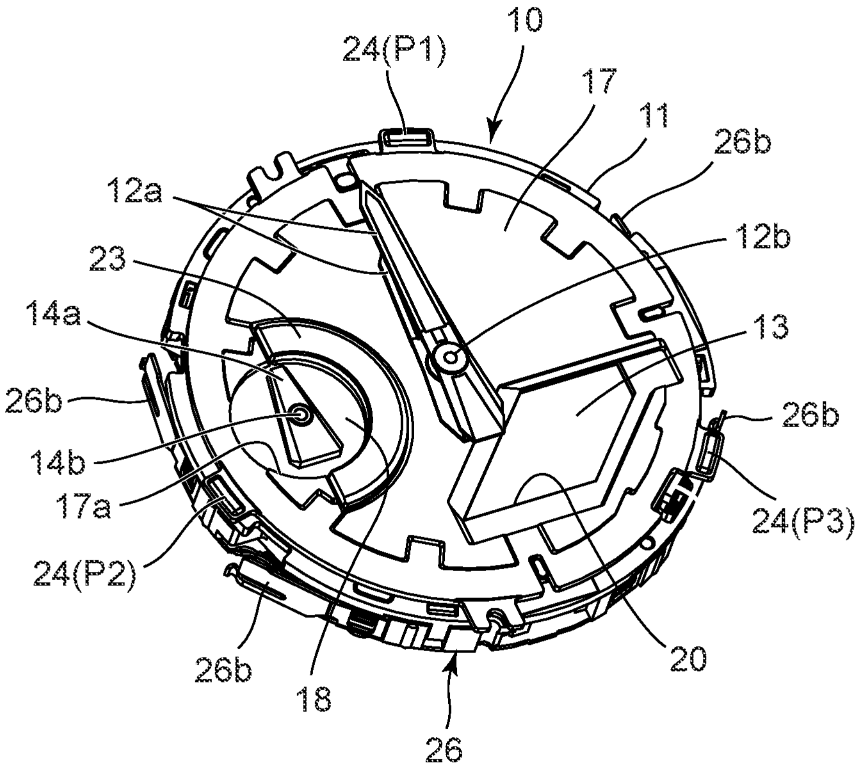
FIG. 5 is an enlarged perspective view of the timepiece module of the wristwatch shown in FIG. 4.

On the other hand, on the upper surface of the housing 11, a first dial plate 17 is arranged via a hold-down plate 16 having a ring shape, as shown in FIG. 3 to FIG. 5. This first dial plate 17 is formed such that its outer circumference is substantially equal to those of the housing 11 and the hold-down plate 16. As a result, this first dial plate 17 is structured such that its outer circumferential part is arranged corresponding to the undersurface of the flange section 4*a* of the main body case 4 while being arranged on the hold-down plate 16.

In an area inside the hold-down plate 16 having the ring shape, a second dial plate 18 and a solar panel 19 are arranged overlapping with each other, as shown in FIG. 3. The solar panel 19 is arranged on the upper surface of the housing 11 and its outer circumferential part is arranged on a stepped section 16*a* formed in the undersurface of the inner circumferential side of the hold-down plate 16. Also, the second dial plate 18, of which the outer circumference is formed to be substantially equal to the inner circumference of the hold-down plate 16, is arranged on the solar panel 19 while being within the inner circumference of the hold-down plate 16.

The first dial plate 17, above which the pointers 12*a* of the first timepiece movement 12 are moved, is made of a light transmissive synthetic resin such as polycarbonate (PC), as shown in FIG. 3 to FIG. 5. Similarly, the second dial plate 18, above which the sub-pointer 14*a* of the second timepiece movement 14 is rotated, is also made of a light transmissive synthetic resin such as polycarbonate (PC).

As a result, the solar panel 19 is structured such that external light that has entered into the wristwatch case 1 from the outside of the wristwatch case 1 through the watch glass 6 is applied to the solar panel 19 through the first dial plate 17 and the second dial plate 18, and generates electromotive force so as to generate electricity, as shown in FIG. 3.

On a substantially five o'clock side of the first dial plate 17, a substantially five o'clock side of the second dial plate 18, and a substantially five o'clock side of the solar panel 19, display window sections 20 to which the display area of the liquid crystal display panel 13 corresponds are formed corresponding to the display opening section 11*a* of the housing 11, as shown in FIG. 3 to FIG. 5. Also, in the center of the first dial plate 17, the center of the second dial plate 18, the center of the solar panel 19, and the center of the housing 11, through holes 21 are formed penetrating vertically, into which a pointer shaft 12*b* where the pointers 12*a* of the first timepiece movement 12 are attached is inserted.

Moreover, on a substantially nine o'clock side of the first dial plate 17, a sub-display opening section 17*a* having a circular shape is formed corresponding to a sub-display area where the sub-pointer 14*a* of the second timepiece movement 14 is moved, as shown in FIG. 4, FIG. 5, and FIG. 8. In a portion of the second dial plate 18 on the nine o'clock side, a portion of the solar panel 19 on the nine o'clock side, and a portion of the housing 11 on the nine o'clock side, insertion holes 22 corresponding to the center of the sub-display opening section 17*a* of the first dial plate 17 are formed penetrating vertically, into which a sub-pointer shaft 14*b* where the sub-pointer 14*a* of the second timepiece movement 14 is attached is inserted.

Furthermore, on an outer circumferential portion of the sub-display opening section 17*a* of the first dial plate 17, a decoration section 23 having a substantially semi-circular shape is formed, as shown in FIG. 3 to FIG. 5, and FIG. 8. This decoration section 23, which is a decorative member, has scale marks (not shown in the drawings) that indicate sub-functional information such as a remaining battery level by indication by the sub-pointer 14*a*, and is made of a highly rigid synthetic resin. As a result, the timepiece module 10 is structured such that the deformation of its portion corresponding to the decoration section 23 is suppressed.

On the timepiece module 10, a plurality of holding sections 24 for holding the timepiece module 10 in the wristwatch case 1 is provided such that the flexural deformation of the timepiece module 10 is restricted to deformation where a virtual straight line extending in a longitudinal direction of the above-described brittle member serves as the center line, as shown in FIG. 3 and FIG. 5. These holding sections 24 are formed using a rigid synthetic resin, and provided projecting upward on the upper surfaces of outer circumferential portions of the first dial plate 17.

That is, the first dial plate 17 is structured such that, when its outer circumferential part is arranged under the ring-shaped flange section 4*a* provided in the main body case 4 of the wristwatch case 1, the plurality of holding sections 24 is pressed against the undersurface of the flange section 4*a*, as shown in FIG. 3, FIG. 5, and FIG. 7. As a result, the timepiece module 10 is structured to be held in the main body case 4 with only the plurality of holding sections 24 formed on the outer circumferential portions of the first dial plate 17 being pressed against the flange section 4*a* in the main body case 4.

Figure 9:
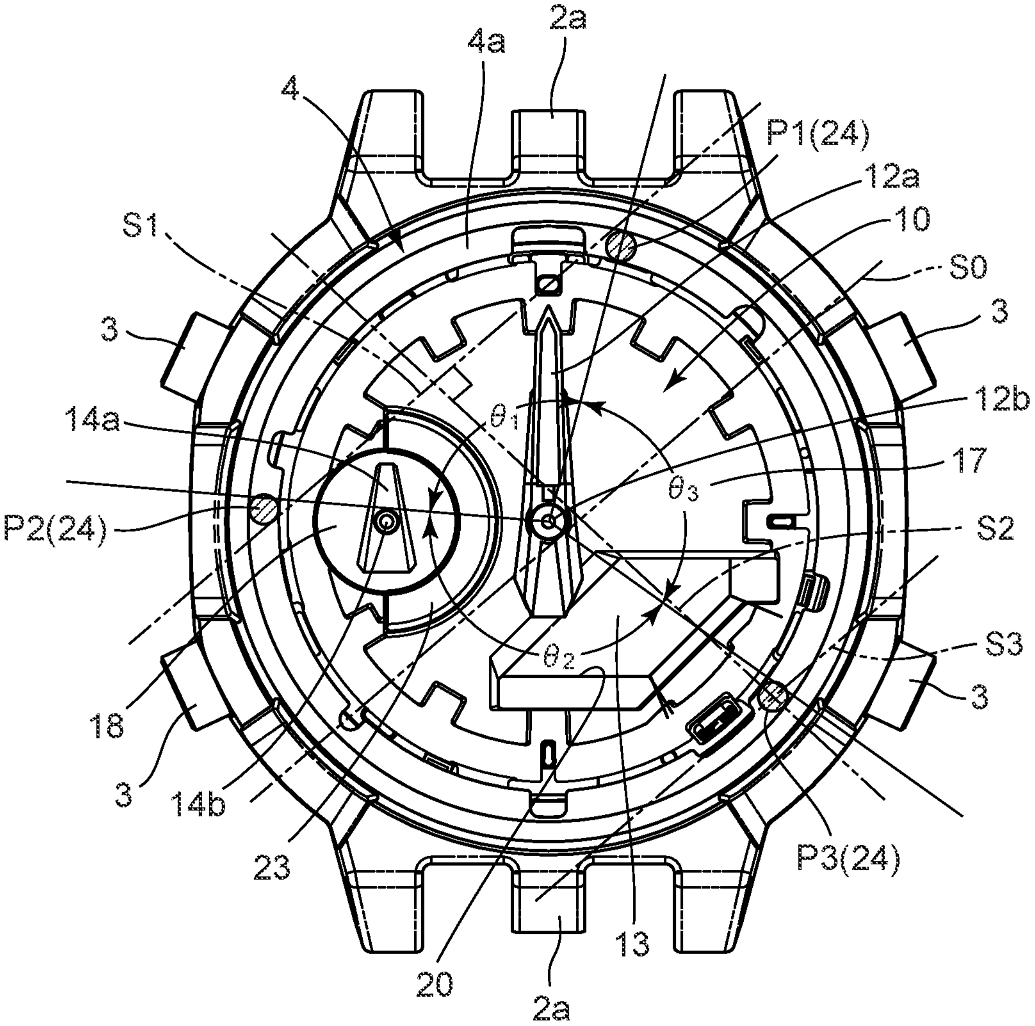
FIG. 9 is an enlarged front view showing the positions of a plurality of holding members for the wristwatch shown in FIG. 4.
Figure 10:
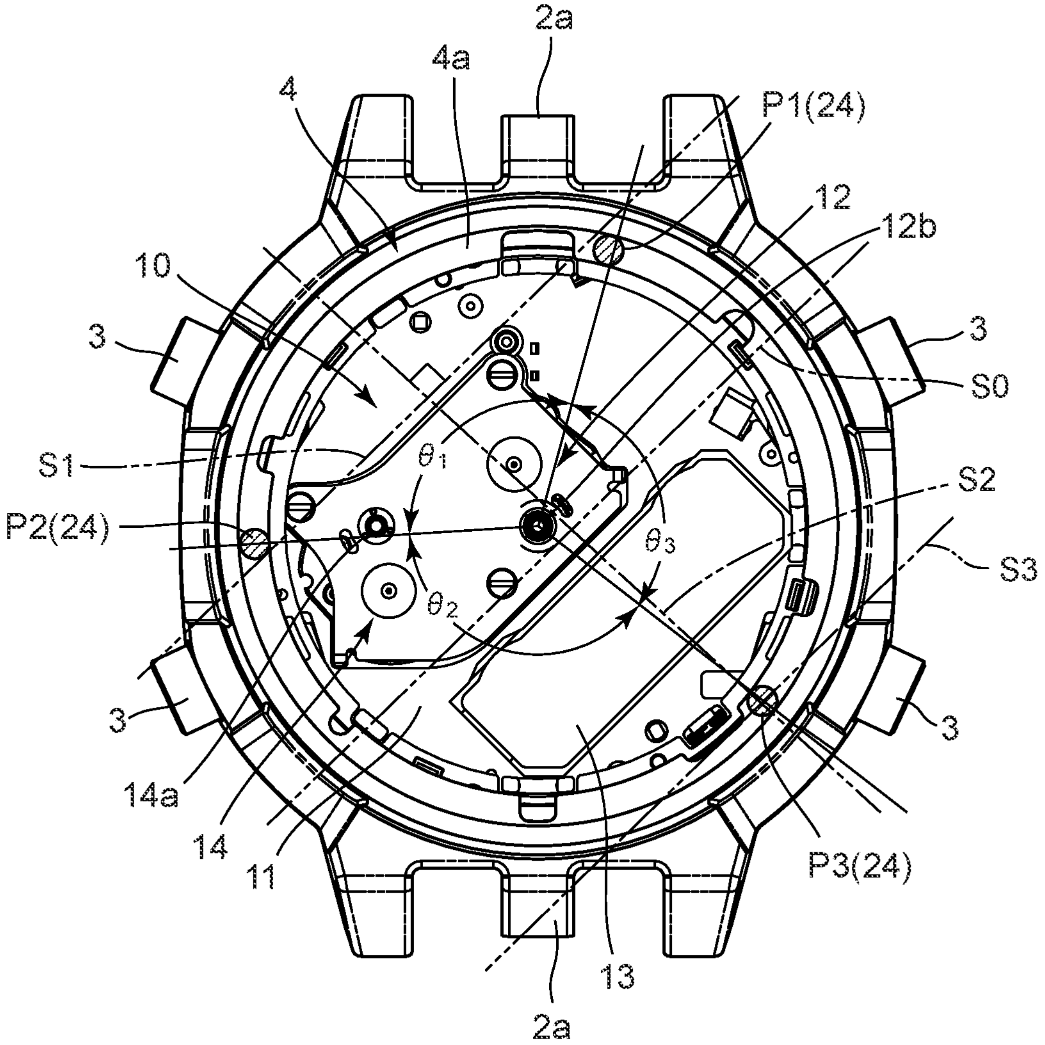
FIG. 10 is an enlarged front view showing the positions of the plurality of holding members for the wristwatch shown in FIG. 6.

These holding sections 24 are provided at three points including two points P1 and P2 close to points where a first virtual straight line S1 extending in a substantially same direction as the longitudinal direction of the liquid crystal display panel 13 intersects with outer circumferential portions of first dial plate 17 of the timepiece module 10, and one point P3 where a second virtual straight line S2 perpendicularly intersecting with the first virtual straight line S1 intersects with an outer circumferential portion of the first dial plate 17 of the timepiece module 10, as shown in FIG. 5, FIG. 9, and FIG. 10.

Also, between the liquid crystal display panel 13 and the decoration sections 23, a virtual straight line S0 is located in a manner not to overlap with the liquid crystal display panel 13 and the decoration section 23, as shown in FIG. 9. This virtual straight line S0 is a straight line substantially parallel to a virtual line (not shown in the drawings) extending in the longitudinal direction of the liquid crystal display panel 13. The "substantially parallel straight line" herein refers to a straight line tilted at an angle of, for example, ±5 degrees with respect to a parallel straight line.

The first virtual straight line S1 is a straight line extending in a substantially same direction as the longitudinal direction of the liquid crystal display panel 13 and substantially parallel to the virtual straight line S0, and located on the opposite side of the liquid crystal display panel 13 across the center of the timepiece module 10, as shown in FIG. 9 and FIG. 10. FIG. 9 also shows a third virtual straight line S3, which is a straight line extending in a substantially same direction as the longitudinal direction of the liquid crystal display panel 13 and substantially parallel to the virtual straight line S0 as with the first virtual straight line S1, and located on the liquid crystal display panel 13 side with respect to the center of the timepiece module 10. The virtual straight line S0 is located between the first virtual straight line S1 and this third virtual straight line S3.

The second virtual straight line S2 is a straight line which substantially perpendicularly intersects with the virtual straight line S0 and the first virtual straight line S1 while passing through a substantially center portion of the timepiece module 10, as shown in FIG. 9 and FIG. 10.

That is, the liquid crystal display panel 13, which is a brittle member, is provided at a position overlapping with the second virtual straight line S2 perpendicularly intersecting with the first virtual straight line S1, as shown in FIG. 5, FIG. 9, and FIG. 10. The two intersection points P1 and P2 are located close to the points where the first virtual straight line S1 intersects with the outer circumference of the timepiece module 10, and the flexural deformation of the timepiece module occurs such that a portion of the timepiece module 10 corresponding to the virtual straight line S0 has the largest displacement amount. On the timepiece module 10, the plurality of holding sections 24 is provided such that the virtual straight line S0 corresponding to this portion where stress is concentrated during flexural deformation does not overlap with the liquid crystal display panel 13.

More specifically, the plurality of holding sections 24 is provided at the three points including the point P1 near the twelve o'clock side and the point P2 near the nine o'clock side which are located close to the points where the first virtual straight line S1 intersects with the outer circumferential portions of the first dial plate 17, and the point P3 near the five o'clock side where the second virtual straight line S2 intersects with the outer circumferential portion of the first dial plate 17, as shown in FIG. 5, FIG. 9, and FIG. 10. These holding sections 24 are positioned along the outer circumference of the timepiece module 10, that is, the outer circumference of the first dial plate 17. Note that these holding sections 24 are not arranged at equal intervals but arranged at intervals slightly different from one another. Therefore, the central angles θ1, θ2, and θ3 of arcs acquired by the outer circumferential circle of the first dial plate 17 being divided into three portions at the positions of the holding sections 24 are slightly different from one another.

In an area between the lower part of the timepiece module and the inner surface (upper surface) of the bottom part of the middle frame 9, a buffering member 25 is arranged, as shown in FIG. 3. As a result, the timepiece module 10 is structured such that, when this the timepiece module 10 is arranged in the main body case 4 via the middle frame 9 and the back cover 8 is attached to the lower part of the main body case 4, the plurality of holding sections 24 provided on the outer circumferential portions of the first dial plate 17 is pressed against the undersurface of the flange section 4*a* in the main body case 4 by the buffering member 25.

Next, a procedure for assembling this wristwatch is described.

First, the timepiece module 10 is assembled. In this assembly, first, the first and second timepiece movements 12 and 14 and the liquid crystal display panel 13 are arranged in the housing 11. More specifically, the first timepiece movement 12 is positioned corresponding to a substantially central portion of the housing 11, and the pointer shaft 12*b* is inserted into the through hole 21 of the housing 11.

Similarly, the second timepiece movement 14 is positioned corresponding to a substantially nine o'clock side of the housing 11, and the sub-pointer shaft 14*b* is inserted into the insertion hole 22 of the housing 11. In this state, the first and second timepiece movements 12 and 14 are arranged in the housing 11. In addition, the liquid crystal display panel 13 is placed to be positioned from the three o'clock side of the housing 11 to the six o'clock side thereof and, in this state, arranged in the housing 11 while corresponding to the display opening section 11*a* of the housing 11.

Then, the circuit board 15 is arranged on the undersurface of the housing 11. Here, the first and second timepiece movements 12 and 14 are electrically connected to the circuit board 15. In addition, the liquid crystal display panel 13 is electrically connected to and supported on the circuit board by the interconnector 13*a*.

In this state, the base plate 26 is arranged under the circuit board 15 such that the plurality of hook sections 26*a* provided upright on the outer circumferential portions of the base plate 26 engages with the plurality of projection sections 11*b* formed on outer circumferential portions of the housing 11. As a result, the circuit board 15 is pressed against and attached to the undersurface of the housing 11, and the first and second timepiece movements 12 and 14 and the liquid crystal display panel 13 are mounted in the housing 11. Here, the contact springs 26*b* provided on the plurality of hook sections 26*a* are arranged on the two o'clock side, four o'clock side, eight o'clock side, and ten o'clock side of the housing 11.

Then, the solar panel 19 is arranged on the upper surface of the housing 11, and the second dial plate 18 is arranged on this solar panel 19. In this state, the ring-shaped hold-down plate 16 is arranged on an upper surface portion of the housing 11 corresponding to an area around the solar panel 19 and the second dial plate 18, and the first dial plate 17 is arranged on this hold-down plate 16. Here, the pointer shaft 12*b* of the first timepiece movement 12 is inserted into the through holes 21 coaxially formed in the center of the solar panel 19, the center of the second dial plate 18, and the center of the first dial plate 17.

In addition, the display opening section 11*a* of the housing 11 is positioned corresponding to the display window sections coaxially formed on a substantially five o'clock side of the solar panel 19, a substantially five o'clock side of the second dial plate 18, and a substantially five o'clock side of the first dial plate 17 so that the display area of the liquid crystal display panel 13 is positioned corresponding thereto. Moreover, the sub-pointer shaft 14*b* of the second timepiece movement 14 is inserted into the insertion holes 22 coaxially formed on a substantially nine o'clock side of the solar panel 19 and a substantially nine o'clock side of the second dial plate 18, and arranged in the sub-display opening section 17*a* having a circular shape and formed on a substantially nine o'clock side of the first dial plate 17.

In this state, when attached to the pointer shaft 12*b* of the first timepiece movement 12, the pointers 12*a* are brought into states where they are movable above the first dial plate 17. In addition, when attached to the sub-pointer shaft 14*b* of the second timepiece movement 14, the sub-pointer 14*a* is arranged in the circular-shaped sub-display opening section 17*a* of the first dial plate 17, and brought into a state where it is movable above the second dial plate 18. By this attachment, the assembly of the timepiece module 10 is completed.

Next, a procedure for mounting the timepiece module 10 assembled as described above in the wristwatch case 1 is described.

First, the parting member 7 is inserted from above into the upper part of the main body case 4 of the wristwatch case 1, and arranged on the ring-shaped flange section 4*a* provided in the main body case 4. In this state, the watch glass 6 is fitted from above into the upper opening of the main body case 4 together with the packing 6*a*, so that the parting member 7 is pressed against and fixed to the flange section 4*a* of the main body case 4 by the inserted watch glass 6.

Then, the buffering member 25 is arranged on the undersurface of the timepiece module 10, and the timepiece module 10 is arranged in the middle frame 9. In this state, the timepiece module 10 is inserted from below into the main body case 4 together with the middle frame 9, and the plurality of holding sections 24 provided on the outer circumferential portions of the first dial plate 17 of the timepiece module 10 is brought into contact with the undersurface of the flange section 4*a* of the main body case 4.

Here, the holding sections 24 at the two points P1 and P2 close to the points where the first virtual straight line S1 extending in a substantially same direction as the longitudinal direction of the liquid crystal display panel 13 intersects with the outer circumferential portions of first dial plate 17 of the timepiece module 10 are arranged near the twelve o'clock side and nine o'clock side of the housing 11. In addition, the holding section 24 at the one point P3 where the second virtual straight line S2 perpendicularly intersecting with the first virtual straight line S1 intersects with the outer circumferential portion of the first dial plate 17 of the timepiece module 10 is arranged near the five o'clock side of the housing 11.

As a result, the timepiece module 10 is held in the main body case 4 by the plurality of holding sections 24 such that the flexural deformation of the timepiece module 10 is restricted to deformation where the virtual straight line extending in the longitudinal direction of the liquid crystal display panel 13 serves as the center line. In this state, the back cover 8 is attached to the lower part of the main body case 4 together with the waterproof ring 8*a*. As a result, the plurality of holding sections 24 provided on the outer circumferential portions of the first dial plate 17 is pressed against the undersurface of the flange section 4*a* in the main body case 4.

In this state, the plurality of push button switches 3 is attached to the two o'clock side, four o'clock side, eight o'clock side, and ten o'clock side of the main body case 4. These push button switches 3 are positioned corresponding to the plurality of contact springs 26*b* provided on the base plate 26 of the timepiece module 10. Then, the exterior case 5 is attached to the outer circumferential part of the main body case 4. Here, the first exterior member 5*a* of the exterior case 5 is attached to an outer circumferential portion of the main body case 4, and the second exterior member 5*b* of the exterior case 5 is attached to an outer circumferential portion of the first exterior member 5*a* and the upper part of the main body case 4. By this attachment, the assembly of the wristwatch is completed.

Next, the usage of the wristwatch worn on an arm is described.

In the case of this wristwatch, normally, information such as a time of day, a date, and a day of the week, and sub-functional information such as a remaining battery level can be checked by the timepiece module 10. That is, the pointers 12*a* are driven above the first dial plate 17 by the first timepiece movement 12 of the timepiece module 10 so as to indicate the time, whereby the time can be checked.

In addition, the liquid crystal display panel 13 of the timepiece module 10 electro-optically displays information such as a time of day, a date, and a day of the week, whereby the information such as a time of day, a date, and a day of the week can be checked through the display window section 20 and the display opening section 11*a*. Moreover, by the second timepiece movement 14 of the timepiece module 10, the sub-pointer 14*a* is rotated above the second dial plate 18 in the sub-display opening section 17*a* of the first dial plate 17 so as to indicate sub-functional information such as a remaining battery level, whereby the sub-functional information such as a remaining battery level can be checked.

In this state, when the wristwatch is subjected to an impact from above, the timepiece module 10 mounted in the wristwatch case 1 may be flexurally deformed in vertical directions. However, since the timepiece module 10 has been mounted in the wristwatch case 1 with the plural holding sections 24, which are on the outer circumferential portions of the first dial plate 17 provided on the upper part of the housing 11 via the hold-down plate 16, being pressed against the undersurface of the ring-shaped flange section 4*a* provided in the main body case 4 of the wristwatch case 1, the flexural deformation of the timepiece module 10 is restricted by these holding sections 24.

That is, the timepiece module 10 has been held in the main body case 4 by the plurality of holding sections 24 such that the flexural deformation of the timepiece module 10 is restricted to deformation where the virtual straight line extending in the longitudinal direction of the liquid crystal display panel 13 serves as the center line. Accordingly, since the timepiece module 10 is flexurally deformed with the virtual straight line extending in the longitudinal direction of the liquid crystal display panel 13 as the center line, a force that is exerted onto and flexurally deforms the liquid crystal display panel 13 along with the flexural deformation of the timepiece module 10 can be suppressed, whereby the liquid crystal display panel 13 can be prevented from being damaged such as being cracked.

Here, it is only required that the flexural deformation line, that is, the virtual straight line S0 does not overlap with the liquid crystal display panel 13. Since the plurality of holding sections 24 has been provided at the three points including the two points P1 and P2 near the twelve o'clock side and the nine o'clock side which are close to the points where the first virtual straight line S1 extending in a substantially same direction as the longitudinal direction of the liquid crystal display panel 13 and located on the opposite side of the liquid crystal display panel 13 across the center of the timepiece module 10 intersects with the outer circumferential portions of the first dial plate 17 and the one point P3 near the five o'clock side where the second virtual straight line S2 perpendicularly intersecting with the first virtual straight line S1 intersects with the outer circumferential portion of the first dial plate 17 located on the liquid crystal display panel 13 side with respect to the center of the timepiece module the flexural deformation of the timepiece module 10 can be restricted to deformation where the virtual straight line extending in the longitudinal direction of the liquid crystal display panel 13 serves as the center line. Here, by the distance between the first virtual straight line S1 and the point P3 being lengthened, the timepiece module 10 can be flexurally deformed more easily, whereby the flexural deformation of the timepiece module 10 can be more reliably restricted to deformation where the virtual straight line extending in the longitudinal direction of the liquid crystal display panel 13 serves as the center line.

In the present embodiment, the plurality of holding sections 24 is provided at the points P1 to P3 near the twelve o'clock side, the nine o'clock side, and the five o'clock side of the outer circumferential part of the first dial plate 17 along the outer circumference of the first dial plate 17 at intervals slightly different from one another such that the central angles θ1, θ2, and θ3 of the arcs acquired by the outer circumferential circle of the first dial plate 17 being divided into three portions are slightly different from one another. Thus, the flexural deformation of the timepiece module 10 can be reliably and favorably restricted to deformation where the virtual straight line extending in the longitudinal direction of the liquid crystal display panel 13 serves as the center line, whereby force to be exerted onto the liquid crystal display panel 13 is limited to a force that occurs along with the deformation of the timepiece module 10 where the virtual straight line extending in the longitudinal direction of the liquid crystal display panel 13 serves as the center line. As a result, the liquid crystal display panel 13 can be reliably prevented from being damaged such as being cracked.

As described above, this wristwatch includes the wristwatch case 1, the timepiece module 10 which has a liquid crystal display panel 13 that is a brittle member and provided in the wristwatch case 1, and the plurality of holding sections 24 which holds the timepiece module 10 in the wristwatch case 1 such that the flexural deformation of the timepiece module 10 is restricted to deformation where the virtual straight line extending in the longitudinal direction of the liquid crystal display panel 13 serves as the center line. As a result of this structure, the liquid crystal display panel 13 can be prevented from being damaged.

That is, in this wristwatch, the flexural deformation of the timepiece module 10 is restricted by the plurality of holding sections 24 to deformation where the virtual straight line extending in the longitudinal direction of the liquid crystal display panel 13 serves as the center line. Accordingly, even when the wristwatch case 1 is subjected to an impact from above and the timepiece module 10 is flexurally deformed, force to be exerted onto the liquid crystal display panel 13 is limited by the plurality of holding sections 24 to a force that occurs along with the deformation of the timepiece module 10 where the virtual straight line extending in the longitudinal direction of the liquid crystal display panel 13 serves as the center line. As a result of this structure, the area of flexural deformation does not overlap with the position of the liquid crystal display panel 13, whereby the liquid crystal display panel 13 can be prevented from being damaged such as being cracked.

In this wristwatch of the present embodiment, since the plurality of holding sections 24 is provided at the three points including the two points P1 and P2 close to the points where the first virtual straight line S1 extending in a substantially same direction as the longitudinal direction of the liquid crystal display panel 13 and located on the opposite side of the liquid crystal display panel 13 across the center of the timepiece module 10 intersects with outer circumferential portions of the timepiece module 10 and the one point P3 where the second virtual straight line S2 perpendicularly intersecting with the first virtual straight line S1 intersects with an outer circumferential portion of the timepiece module located on the liquid crystal display panel 13 side with respect to the center of the timepiece module 10, the flexural deformation of the timepiece module 10 can be reliably and favorably restricted by the plurality of holding sections 24 to deformation where the virtual straight line extending in the longitudinal direction of the liquid crystal display panel 13 serves as the center line.

That is, in the case of this wristwatch, the plurality of holding sections 24 is provided at the three points including the two points P1 and P2 near the twelve o'clock side and the nine o'clock side which are close to the points where the first virtual straight line S1 extending in a substantially same direction as the longitudinal direction of the liquid crystal display panel 13 intersects with the outer circumferential portions of the timepiece module 10 and the one point P3 near the five o'clock side where the second virtual straight line S2 perpendicularly intersecting with the first virtual straight line S1 intersects with the outer circumferential portion of the timepiece module 10 located on the liquid crystal display panel 13 side with respect to the center of the timepiece module 10.

As a result, in the case of this wristwatch, the timepiece module 10 is not flexurally deformed such that a virtual straight line perpendicularly intersecting with the virtual straight line extending in the longitudinal direction of the liquid crystal display panel 13 serves as the center line, and the flexural deformation of the timepiece module 10 can be restricted to deformation where the virtual straight line extending in the longitudinal direction of the liquid crystal display panel 13 serves as the center line, whereby force to be exerted onto the liquid crystal display panel 13 is limited to a force that occurs along with the deformation of the timepiece module 10 where the virtual straight line extending in the longitudinal direction of the liquid crystal display panel 13 serves as the center line. Accordingly, the liquid crystal display panel 13 can be reliably and favorably prevented from being damaged such as being cracked.

Also, in this wristwatch, the liquid crystal display panel 13, which is a brittle member, is provided at a position overlapping with the second virtual straight line S2, the two intersection points P1 and P2 are located close to the points where the first virtual straight line S1 intersects with the outer circumference of the timepiece module 10, the virtual straight line S0 corresponds to the portion of the timepiece module 10 that has the largest displacement amount during flexural deformation, and the plurality of holding sections 24 is provided such that the virtual straight line S0 corresponding the portion that has the largest displacement amount during flexural deformation does not overlap with the liquid crystal display panel 13. Accordingly, by the plurality of holding sections 24, the flexural deformation of the timepiece module can be reliably and favorably restricted to deformation where the virtual straight line extending in the longitudinal direction of the liquid crystal display panel 13 serves as the center line.

That is, in the case of this wristwatch, the plurality of holding sections 24 enables the structure where the virtual straight line S0 corresponding the portion of the timepiece module 10 that has the largest displacement amount during flexural deformation does not overlap with the liquid crystal display panel 13, whereby the flexural deformation of the timepiece module 10 can be restricted to deformation where the virtual straight line extending in the longitudinal direction of the liquid crystal display panel 13 serves as the center line, and the liquid crystal display panel 13 can be reliably and favorably prevented from being damaged such as being cracked.

Moreover, in this wristwatch, the plurality of holding sections 24 is provided along the outer circumference of the timepiece module 10 at intervals slightly different from one another, and thereby arranged at the three points P1 to P3 near the twelve o'clock side, nine o'clock side, and the five o'clock side of the outer circumferential part of the first dial plate 17 such that the central angles θ1, θ2, and θ3 of arcs acquired by the outer circumferential circle of the first dial plate 17 being divided into three portions at those positions are slightly different from one another. Therefore, the flexural deformation of the timepiece module 10 can be reliably and favorably restricted to deformation where the virtual straight line extending in the longitudinal direction of the liquid crystal display panel 13 serves as the center line, whereby force to be exerted onto the liquid crystal display panel 13 is limited to a force that occurs along with the deformation of the timepiece module 10 where the virtual straight line extending in the longitudinal direction of the liquid crystal display panel 13 serves as the center line. As a result, the liquid crystal display panel 13 can be reliably and favorably prevented from being damaged such as being cracked.

Furthermore, in this wristwatch, the timepiece module 10 includes the decoration section 23 which is a reinforcement member, and the plurality of holding sections 24 is arranged such that the virtual straight line which serves as the center line during the flexural deformation of the timepiece module is located between the liquid crystal display panel 13 and the decoration section 23. That is, by the plurality of holding sections 24, the virtual straight line which serves as the center line during the flexural deformation of the timepiece module 10 can be located between the liquid crystal display panel 13 and the decoration section 23. By this structure as well, the liquid crystal display panel 13 can be reliably and favorably prevented from being damaged such as being cracked.

Still further, even though a brittle member serves as the liquid crystal display panel 13 that is a display member and the liquid crystal display panel 13 has a substantially rectangular shape in this wristwatch, since the flexural deformation of the timepiece module 10 can be restricted by the plurality of holding sections 24 to deformation where the virtual straight line extending in the longitudinal direction of the liquid crystal display panel 13 serves as the center line, force to be exerted onto the liquid crystal display panel 13 can be limited to a force that occurs along with the deformation of the timepiece module 10 where the virtual straight line extending in the longitudinal direction of the liquid crystal display panel 13 serves as the center line, whereby the liquid crystal display panel 13 can be prevented from being damaged such as being cracked.

In this wristwatch of the present embodiment, even though the liquid crystal display panel 13 having a substantially rectangular shape is arranged extending from the three o'clock side to the six o'clock side, the flexural deformation of the timepiece module 10 can be reliably and favorably restricted by the plurality of holding sections 24 at the three points P1 to P3 near the twelve o'clock side, the nine o'clock side, and the five o'clock side to deformation where the virtual straight line extending in the longitudinal direction of the liquid crystal display panel 13 serves as the center line, and force to be exerted onto the liquid crystal display panel 13 can be limited to a force that occurs along with the deformation of the timepiece module 10 where the virtual straight line extending in the longitudinal direction of the liquid crystal display panel 13 serves as the center line, whereby the liquid crystal display panel 13 can be prevented from being damaged such as being cracked.

Also, in this wristwatch, the timepiece module 10 includes the housing 11 provided with the liquid crystal display panel 13, and the first dial plate 17 arranged on the upper surface of the housing 11, in which the plurality of holding sections 24 is provided on the outer circumferential portions of the first dial plate 17. As a result of this structure, when the timepiece module 10 is mounted in the wristwatch case 1, the plurality of holding sections 24 provided on the first dial plate 17 is unfailingly and favorably pressed against the ring-shaped flange section **4*a* provided in the main body case 4 of the wristwatch case 1, and the timepiece module 10 is reliably arranged in the main body case 4**.

That is, in this wristwatch where the first dial plate 17 serves as the topmost surface of the timepiece module 10, when the timepiece module 10 is inserted from below into the main body case 4, the plurality of holding sections 24 provided on the outer circumferential portions of the first dial plate 17 serving as the topmost surface of the timepiece module 10 is unfailingly and favorably pressed against the undersurface of the flange section **4*a* in the main body case 4, whereby the timepiece module 10 is reliably and favorably arranged and held in the main body case 4**.

Moreover, in this wristwatch, the decoration section 23 which is, for example, a reinforcement member with decoration is provided on the first dial plate 17. As a result, the decorativeness and design of the wristwatch is enhanced. In addition, by being made of a highly rigid synthetic resin or, if not, by being thickly formed, the decoration section 23 can suppress the flexural deformation of the timepiece module 10, which also prevents the liquid crystal display panel 13 from being damaged such as being cracked.

In the above-described embodiment, the timepiece module 10 includes the liquid crystal display panel 13 which is a brittle member. However, the present invention is not limited thereto. As this brittle member, a flat type display panel such as an EL (Electro-Luminescence) display panel may be used.

Also, in the above-described embodiment, the holding sections 24 are provided on the outer circumferential portions of the first dial plate 17 of the timepiece module 10. However, the present invention is not limited thereto. For example, a structure may be adopted in which these plural holding sections 24 are provided on the ring-shaped hold-down plate 16 of the timepiece module 10. In that structure, it is only required that the outer circumferential rim of the first dial plate 17 is formed smaller than that of the hold-down plate 16 so that the upper surface of the hold-down plate 16 can oppose and come in contact with the undersurface of the flange section 4*a* in the main body case 4.

In addition, in the present invention, a structure may be adopted in which the holding sections 24 are provided on outer circumferential portions of the housing 11. In that structure, it is only required that the first dial plate 17 and the hold-down plate 16 are formed smaller than the outer circumferential part of the housing 11 so that this outer circumferential part of the housing 11 can oppose and come in contact with the undersurface of the flange section 4*a* in the main body case 4.

Also, in the above-described embodiment, the liquid crystal display panel 13 is arranged extending from the three o'clock side of the timepiece module 10 to the six o'clock side thereof, and the plurality of holding sections 24 is provided at the three points P1 to P3 near the twelve o'clock side, nine o'clock side, and five o'clock side of the timepiece module 10. However, the present invention is not limited thereto, and the liquid crystal display panel 13 may be arranged on an arbitrary portion of the timepiece module 10. In that case as well, it is only required that the plurality of holding sections 24 holds the timepiece module 10 in the wristwatch case 1 such that the flexural deformation of the timepiece module 10 is restricted to occur only in the longitudinal direction of the liquid crystal display panel 13.

That is, it is only required that the plurality of holding sections 24 is provided along the outer circumference of the timepiece module 10 at intervals slightly different from one another, at three points including two points close to points where the first virtual straight line S1 extending in a substantially same direction as the longitudinal direction of the liquid crystal display panel 13 and located on the opposite side of the liquid crystal display panel 13 across the center of the timepiece module 10 intersects with outer circumferential portions of the timepiece module 10 and one point where the second virtual straight line S2 perpendicularly intersecting with the first virtual straight line S1 intersects with an outer circumferential portion of the timepiece module located on the liquid crystal display panel 13 side with respect to the center of the timepiece module 10.

Also, in the above-described embodiment, the ring-shaped flange section 4*a* is provided in the main body case 4 of the wristwatch case 1, and the parting member 7 is inserted into the upper part of the main body case 4 and arranged on the flange section 4*a*. However, the present invention is not limited thereto. For example, a structure having no flange section 4*a* in the main body case 4 may be adopted in which the parting member 7 is inserted from below into the main body case 4 and brought into contact with the undersurface of the outer circumferential part of the watch glass 6, and then the timepiece module 10 is inserted from below into the main body case 4 such that the plurality of holding sections 24 is brought into contact with the undersurface of the parting member 7.

Moreover, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and can be applied in electronic devices such as cell-phones and portable information terminals that are used by being worn on an arm.

While the present invention has been described with reference to the preferred embodiments, it is intended that the invention be not limited by any of the details of the description therein but includes all the embodiments which fall within the scope of the appended claims.

What is claimed is:

1. An arm wearable device, comprising:

a case;

a module which has a rectangular brittle member and is provided in the case; and a plurality of holding portions which holds the module in the case such that flexural deformation of the module is restricted to deformation where a virtual straight line extending along a long side of the brittle member serves as a center line, wherein the virtual straight line corresponds to a portion that has a largest displacement amount during flexural deformation of the module.

2. The arm wearable device according to claim 1, wherein the plurality of holding portions comprises of three holding portions, each holding portion is provided at a respective one of three points.

3. The arm wearable device according to claim 2, wherein the plurality of holding portions is provided respectively at the three points, the three points comprising:

(i) two points close to points where a first virtual straight line extending in a same direction as a longitudinal direction along the long side of the brittle member and located on an opposite side to a side where the brittle member is located with respect to where a center of the module intersects with outer circumferential portions of the module; and (ii) one point where a second virtual straight line perpendicularly intersecting with the first virtual straight line intersects with an outer circumferential portion of the module located on a same side as a side where the brittle member is located with respect to the center of the module.

4. The arm wearable device according to claim 3, wherein the brittle member is provided at a position overlapping with the second virtual straight line.

5. The arm wearable device according to claim 4, wherein the plurality of holding portions is provided such that the virtual straight line does not overlap with the brittle member.

6. The arm wearable device according to claim 1, wherein the module includes a reinforcement member.

7. The arm wearable device according to claim 6, wherein, in a front view, the plurality of holding portions is arranged such that the virtual straight line is located between the brittle member and the reinforcement member.

8. The arm wearable device according to claim 1, wherein the brittle member is a rectangular display member.

9. The arm wearable device according to claim 2, wherein the brittle member is a rectangular display member.

10. The arm wearable device according to claim 3, wherein the brittle member is a rectangular display member.

11. The arm wearable device according to claim 1, wherein the module includes a housing where the brittle member is provided, and a dial plate which is arranged on an upper surface of the housing.

12. The arm wearable device according to claim 11, wherein the plurality of holding portions is provided on outer circumferential portions of the dial plate.

13. The arm wearable device according to claim 11, wherein the dial plate is provided with a reinforcement member with decoration.

14. The arm wearable device according to claim 12, wherein the dial plate is provided with a reinforcement member with decoration.

15. The arm wearable device according to claim 1, wherein the module includes a housing where the brittle member is provided, and a hold-down plate which is arranged on an upper surface of the housing.

16. The arm wearable device according to claim 15, wherein the plurality of holding portions is provided on outer circumferential portions of the hold-down plate.

17. A timepiece comprising the arm wearable device according to claim 1.

18. The arm wearable device according to claim 1, wherein the virtual straight line is parallel to the long side of the brittle member.

19. The arm wearable device according to claim 6, wherein the reinforcement member is not on the virtual straight line.

* * * * *